(No Model.)
W. A. PETERS.
APPARATUS FOR MAKING MALT.
No. 483,748. Patented Oct. 4, 1892.
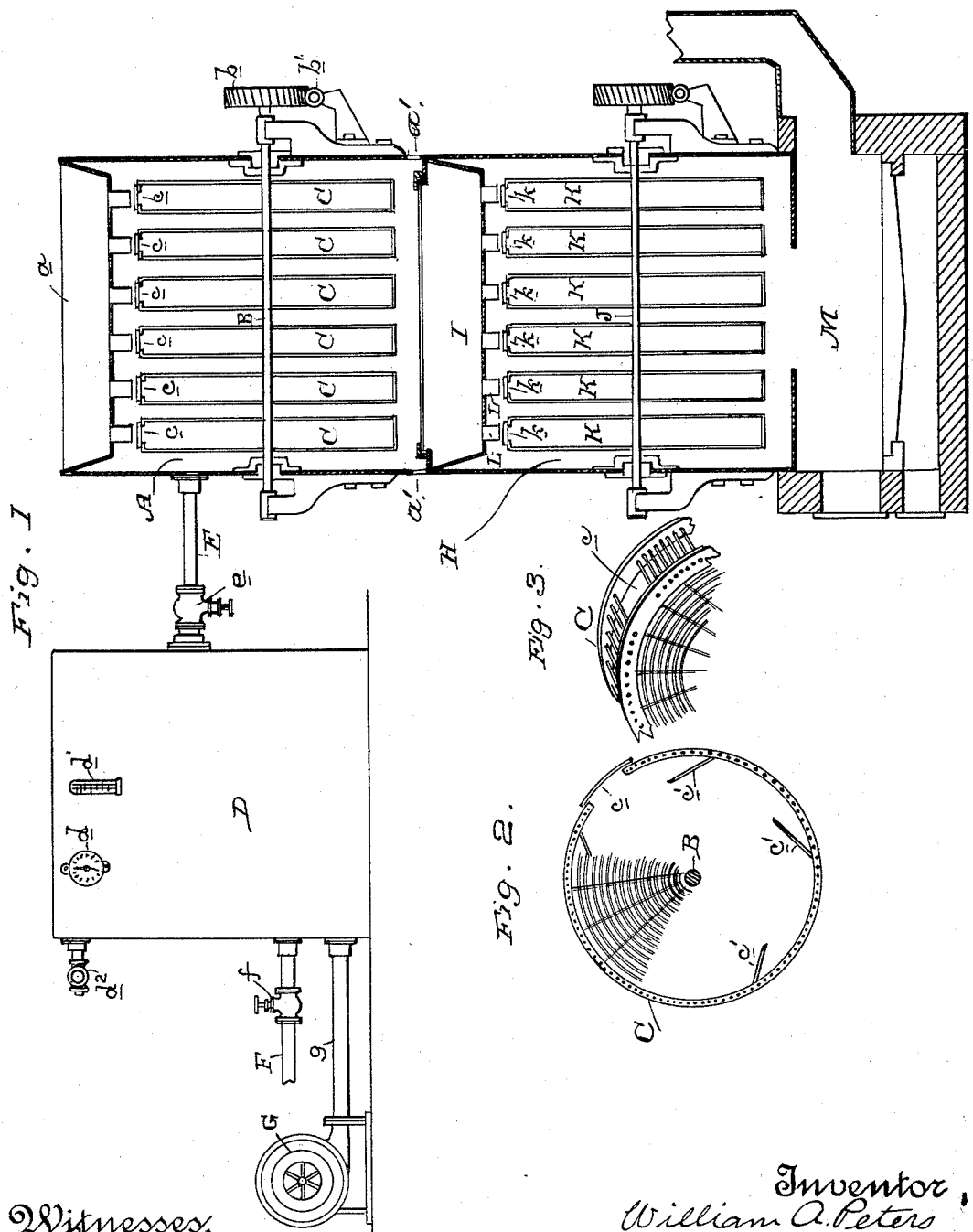
Witnesses,
J. A. Bayless
Inventor,
William A. Peters
By Dewey & Co.
Attys

UNITED STATES PATENT OFFICE.

WILLIAM A. PETERS, OF SAN FRANCISCO, CALIFORNIA.

APPARATUS FOR MAKING MALT.

SPECIFICATION forming part of Letters Patent No. 483,748, dated October 4, 1892.

Application filed August 28, 1891. Serial No. 404,016. (No model.)

*To all whom it may concern:*

Be it known that I, WILLIAM A. PETERS, a citizen of Great Britain, residing in the city and county of San Francisco, State of California, have invented an Apparatus for Making Malt; and I hereby declare the following to be a full, clear, and exact description of the same.

My invention relates to the art of making malt; and it consists of the constructions and combinations of devices which I shall hereinafter fully describe and claim.

Referring to the accompanying drawings for a more complete explanation of my invention, Figure 1 is a sectional elevation of an apparatus by which my improvement may be carried out. Fig. 2 is a side view of one of the cylinders, showing a portion of the wirework. Fig. 3 is a perspective view of a portion of the same.

A is a casing or chamber suitably supported and provided with an inlet funnel or trough $a$ and a moisture-exit opening $a'$. Transversely mounted in this chamber is a shaft B, to which a rotary motion may be imparted by suitable means—such, for example, as the worm-gear $b$ and worm $b'$, here shown.

Upon the shaft B are the foraminous or open-work cylinders C in any suitable number. These are preferably made of wires suitably braced and strengthened. These cylinders lie wholly within the chamber A and are provided with inlet-doors $c$. On the interior of their peripheries they may have the stirring flanges or plates $c'$, Fig. 2.

D is the moisture-laden air-regulating vessel provided with a pressure-gage $d$, a thermometer $d'$, and a safety-valve $d^2$. This regulating-vessel is connected with the chamber A by means of a pipe E, controlled by a valve $e$. It is also connected with a source of steam-supply by means of the steam-pipe F, controlled by a valve $f$.

G is an air blower or fan connected with the regulating-vessel D by means of a pipe $g$.

H is the drying-kiln, located with respect to the chamber A in any suitable and convenient position. It is connected with said chamber by means of a chute I, which represents any communication between the kiln and the chamber by which the contents of the latter may be conducted into the former.

Within the kiln is a shaft J, adapted to be rotated in any suitable manner. Upon this shaft are the foraminous or wirework cylinders K, similar in construction to the cylinders C heretofore described and adapted to be rotated by the shaft. With inlet-doors $k$ in each of these cylinders, the chute communicates by means of any suitable connection, such as is shown by L.

In the lower portion of the kiln is the usual furnace M.

The use of the apparatus is as follows: The barley is first steeped in the tanks in the usual manner. When sufficiently prepared, it is admitted to the cylinders C through the funnel or trough $a$ of the chamber A, and said cylinders are then regularly and slowly rotated. Steam from the source of supply is admitted to the regulating-vessel D, its pressure being indicated by the gage. Cold air is forced by the blower G into the vessel D and, condensing the steam therein, becomes saturated with aqueous vapor, and this air is kept in said vessel at a temperature of about 60° or 70° Fahrenheit, as can be determined by the thermometer. The moisture-laden air is admitted through the connecting-pipe E to the chamber A, and to it the barley in the cylinders is subjected, being thus kept moist, at the same time that it is evenly exposed and subjected to it by reason of the regular and slow turning and agitation. This agitation is assisted by means of the flanges or stirrers $c'$, located within the cylinders. When a sufficient growth has been attained, the malt is discharged from the cylinders through their openings, which are then turned downwardly, and it is carried off through the chute to the kiln wherein it is discharged into the slowly-rotating cylinders K therein. In these cylinders it is kept agitated and is thoroughly dried, the work being then complete. It will be seen that in the chamber A, which corresponds to that step in the old process wherein the barley after being steeped is spread upon the floor and kept turned and moistened by sprinkling it with water, the turning and agitation are done automatically in the cylinders, while the requisite moisture is supplied by the moisture-laden air which continually surrounds the cylinders and which is kept at the even temperature desired, which is made possible, irrespective of outside temperature, by being supplied from the regulating-vessel D. Thus this step is facilitated and an economy is effected in dispensing with workmen at this point, and also in the kiln the drying is effected during the automatic turning or stirring of the grown malt in the cylinders.

Having thus described my invention, what I claim as new, and desire to secure by Letters Patent, is—

1. In an apparatus for making malt, a chamber or casing having a shaft passing transversely through it, the foraminous or open-work cylinders placed side by side on said shaft and having inlet-doors and stirring flanges or plates, means for rotating said shaft and cylinders, a vessel containing moisture-laden air, having a valve-controlled pipe leading to the chamber or casing, and means for forcing said air into the casing, substantially as herein described.

2. In an apparatus for making malt, the combination, with a chamber or casing having a series of revolving foraminous cylinders placed side by side in its upper portion for receiving and agitating the steeped barley and means for supplying moisture-laden air to said upper portion of the casing, of a shaft passing transversely through the lower portion of the casing or chamber, a series of foraminous cylinders placed side by side on said shaft, means for rotating the shaft, and a drying-kiln communicating with the lower cylinders, substantially as herein described.

3. An apparatus for making malt, consisting of a casing or chamber, a shaft passing transversely through the upper portion of the same, a series of foraminous or open-work rotating cylinders placed side by side on said shaft and adapted to receive the steeped barley, the regulating-vessel D, connected with a source of steam-supply and with the casing or chamber, a fan-blower connected with said vessel for forcing moisture-laden air into the chamber or casing, a drying-kiln communicating with the lower portion of the casing or chamber, and a second shaft passing transversely through said lower portion of the casing or chamber, having a series of open-work cylinders in said kiln for receiving the barley from the upper cylinders, substantially as herein described.

4. An apparatus for making malt, comprising a casing or chamber, shafts passing transversely through the upper and lower portions thereof and provided with foraminous cylinders placed side by side, means for rotating said shafts, inlet-doors and stirring-flanges in said cylinders, hoppers having spouts adapted to discharge into said doors, means for forcing moisture-laden air into the upper portion of the casing or chamber, and a kiln in the lower portion of said casing and in which the series of cylinders are located, substantially as herein described.

In witness whereof I have hereunto set my hand.

WILLIAM A. PETERS.

Witnesses:
S. H. NOURSE,
J. A. BAYLESS.